Aug. 3, 1937.  C. P. STOCKER  2,088,618

FREQUENCY REDUCING SYSTEM

Filed June 3, 1935

INVENTOR

Coleman P. Stocker

Patented Aug. 3, 1937

2,088,618

UNITED STATES PATENT OFFICE 2,088,618

FREQUENCY REDUCING SYSTEM

Closman P. Stocker, Lorain, Ohio, assignor of one-half to E. M. Heavens, Elyria, Ohio Application June 3, 1935, Serial No. 24,635

32 Claims. (Cl. 172—281)

This invention relates to frequency reducing systems and more particularly to static frequency reducing systems employing a non-linear impedance element.

In general, if a current of a fundamental frequency in flowing through a circuit resonant to this frequency causes to be produced in this circuit a current of an harmonic frequency of the fundamental frequency, then if this harmonic frequency be supplied to the circuit, a current of the fundamental frequency may be maintained. A necessary condition for this is that a current of the fundamental frequency be started flowing in the circuit.

An object of this invention is to provide an improved and more reliable starting arrangement for starting a current of the fundamental frequency in this type of circuit.

In addition, in circuits of this type the power output is not only relatively low but the range of load or power output is low. Thus, if the circuit operates satisfactorily at full load it is apt to become unstable at no load and cease to operate. If the circuit is stable at no load the maximum power output is greatly reduced.

It is a further object of this invention to increase the maximum power output of such a circuit and to increase the range of load or power output and at the same time to make the circuit less sensitive to abrupt changes in load.

A feature of the invention relates to the automatic starting arrangement for automatically starting a current of the fundamental frequency flowing in the circuit when a current of the harmonic frequency of the fundamental frequency is applied to the circuit.

In accordance with another feature of this invention means are provided for controlling the wave form of or high frequency currents in the output current.

Another object of my invention is to provide a plurality of associated oscillating circuits adapted to oscillate freely at fundamental frequencies and produce harmonics, wherein the fundamental frequency of one of the oscillating circuits has a harmonic, which harmonic is of a frequency equal to the fundamental frequency of another of said oscillating circuits.

Another object of my invention is to provide for establishing a direct current flux and for causing the direct current flux to collapse and induce a voltage in the oscillating circuit of my frequency reducing system and thereby cause a current to flow in the said oscillating circuit independent of the alternating current supplied by the source of alternating current to start free oscillation in the said oscillating circuit at the said fundamental frequency and at the harmonics thereof.

A further object of my invention is the provision of a frequency reducing arrangement adapted to be energized by a source of alternating current and to be started in operation by a source of direct current.

Another object of my invention is to provide for giving stability of operation throughout a wide range of load conditions.

It is also an object of my invention to provide a rectified circuit for establishing a direct current flux, which when the rectified circuit is interrupted, collapses and causes a current to flow in the said oscillating circuit independent of the alternating current supplied by the source of alternating current to start free oscillating in the said oscillating circuit at the said fundamental frequency and at the harmonics thereof.

It is also an object of my invention to provide for causing the starting means to be repeatedly operated until the said free oscillations are started.

It is a further object of my invention for delaying the operation of the flux means and establishing a relatively large amount of flux to insure the positive starting of the said oscillations.

A further object of my invention is the provision of a stabilizing means for shunting a portion of the oscillating circuit to by-pass a portion of the oscillating current from the said shunted portion of the oscillating circuit towards giving stability in the output source throughout a wide range of load conditions.

A further object of my invention is to provide for operating the shunting and stabilizing means substantially at or near the knee of the magnetization curve of the iron core which comprises a part of the shunting or stabilizing means.

A further object of my invention is to increase the effective capacity of the oscillating circuit by utilizing a transformer to step up the voltage impressed upon the condenser, wherein the arrangement stabilizes the oscillating circuit and also permits more power to be obtained from a given set of inductance coils and condensers.

A still further object of my invention is to provide output means connected in circuit relation with the oscillating circuit, so that the voltage across the output means is a combination of the voltage across the condenser and the inductance, or a portion of the voltage across said devices.

Another object of my invention is to provide for delivering a substantially constant output voltage of reduced frequency for relatively wide variations of the input voltage.

These and other objects and features of the invention may be more readily understood from the following description of several embodiments of the invention when read with reference to the attached drawing in which.

Figure 1:
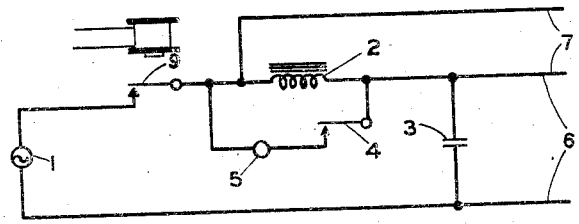
Fig. 1 shows a simple circuit arrangement employing my new starting arrangement.

While it is understood that the invention is not so limited, it will be described with reference to several specific embodiments thereof which are suitable for reducing the frequency current from a commercial alternating current power supply system so that it will be suitable for supplying low frequency current to a signalling system, such as, ringing current for a telephone system.

Similar parts of the different figures are designated with the same reference numerals.

Referring now to the drawing, 1 represents a source of alternating current which for the purpose of illustration will be assumed to be of a frequency of 60-cycles per second. However, it is to be understood that any other suitable frequency may be used. This source of power 1 may be a transformer winding, a power line or a generator which is capable of delivering the required power to the circuit comprising inductance 2 and condenser 3. Again by way of example it will be assumed that this circuit is tuned so as to oscillate freely at a frequency of 20-cycles per second. It is to be understood that this circuit may be tuned so that it will oscillate freely at any other suitable frequency.

Inductance 2 is wound upon a saturable core so its inductance varies in accordance with the current through it or the voltage across it and thus constitutes a non-linear impedance element. The circuit comprising inductance 2 and condenser 3 will therefore distort the wave form of the current through it and thus generate currents of harmonic frequencies.

If now switch 9 is closed to connect source 1 to this circuit and a 20-cycle current started flowing in the circuit a 3rd harmonic or 60-cycle current will be generated due to distortion of the 20-cycle wave form and a current supplied from the 60-cycle source will maintain the 20-cycle current flowing in the circuit. Thus, when the oscillating circuit is once set in operation, the alternating current from the alternating current supply source 1 keeps up the said harmonics that has a frequency that is equal to the frequency of the said source of alternating current, thereby causing electrical energy to be delivered to the oscillating circuit for sustaining the oscillations and for delivering power to the output circuit. In fact some 20-cycle power may be taken from the circuit either from leads 6, connected across condenser 3 or from leads 7 connected across inductance 2. It is to be noted that when the circuit is tuned to 20-cycles the reactance of condenser 3 is much lower to 60-cycles and higher frequencies than is the reactance of inductance 2 so that there will be much less 60-cycle and higher frequency current flowing in output 6 than in output 7.

Figure 2:
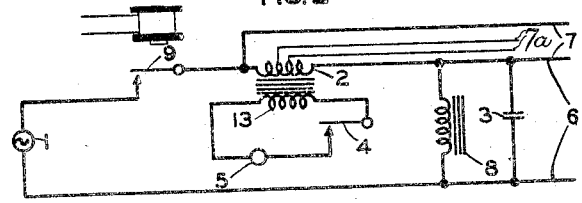
Fig. 2 shows a simplified form of the stabilizing arrangement applied to Fig. 1.

In case the 20-cycle output current is to be used to supply ringing current to a telephone system the audible ring back tone may be readily adjusted by using different percentages of the two output currents from leads 6 and 7 or by connecting a small auxiliary inductance in series with condenser 3 and connecting the output circuit across the series combination of condenser 3 and auxiliary inductance. This arrangement will be described more in detail with reference to Fig. 3. In Figure 2, these different percentages are obtained by connecting the tap leads 7a to the winding of the inductance 2. This means that when the output source is taken from the lower lead and one of the tap leads 7a, the condenser 3 is connected in series with a portion of the winding of the inductance 2. By reason of this arrangement, the tapped portion of the winding of the inductance 2 causes the high frequency current to modify the wave form of the fundamental oscillating current. In other words, at low frequencies, the tapped portion of the winding 2 is ineffective to modify the wave form of the fundamental oscillating current, but becomes effective at higher frequencies to modify the wave form of the fundamental load output current to supply the audible ring back tone of a telephone system.

There are various ways of starting an oscillating current, which by way of example can be 20-cycle current in this circuit. For example, under certain conditions this oscillating current may be started by closing switch 9. This method however is not very effective since the oscillating current is started only once for five or more closures of switch 9.

A more effective way of starting the oscillations is to momentarily short circuit inductance 2 as described in U. S. Patent 1,633,481 granted to J. G. Fallou on June 21, 1927. Under favorable conditions the oscillating current will start about 50% to 75% of the times that the short circuit is broken.

I have discovered that if this short circuit or starting circuit includes a source of direct current 5 the oscillating current will start substantially every time switch 4 is opened. Furthermore this arrangement is capable of starting the oscillating current substantially all the time under conditions where the oscillating current may be started only with the greatest difficulty by other means.

Figure 3:
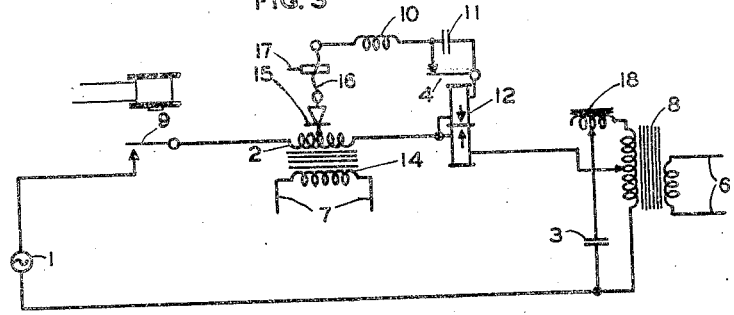
Fig. 3 shows the preferred embodiment of the invention employing the improved starting arrangement, the stabilizing arrangement, the automatic starting feature, and means for controlling the higher frequencies in the output current.

The direct current source 5 may be any suitable source of direct current such as a primary battery, a storage battery, generator or power line. This source may also comprise a unilateral or a symmetrical conducting device such as a rectifier connected across inductance 2 or across a part of inductance 2. Such an arrangement is shown in Fig. 3 where rectifier 15 is connected across a part of inductance 2. This device may be connected in a starting circuit which includes a separate winding on the core of inductance 2 as shown in Fig. 2.

Fig. 3 also shows an automatic switching arrangement for interrupting the circuit of rectifier 15. When switch 9 is closed alternating current from source 1 flows through inductance 2 lower winding of relay 12 and transformer 8. Both alternating current and direct current flow through the right portion of inductance 2, upper winding of relay 12, break contacts 4, of relay 12, radio frequency choke 10 and rectifier 15. The two windings of relay 12 are designed and adjusted so that the alternating current flows through them in opposite directions and produces substantially no flux in the core of relay 12. Then when the direct current has built up to the operate value of relay 12 this relay will operate and interrupt the circuit through rectifier 15 and start an oscillating current flowing through the tuned circuit which circuit includes the lower winding of relay 12, winding of transformer 8, source 1, switch 9, and inductance 2. Relay 12 is held operated by the oscillating current flowing in this circuit. When oscillations are stopped relay 12 will release and close the circuit of rectifier 15 whereupon the above described action is repeated. This particular circuit arrangement has the advantage that it insures that the direct current will build up to a definite value sufficient to insure the starting of the oscillating current before contacts 4 are opened. Condenser 11 and choke 10 are provided to suppress radio frequency current which may cause radio interference.

In case there is some trouble in this circuit or in the output circuit which prevents the oscillating current from starting, relay 12 will operate and release as described above. This wears the contacts 4 and may cause the rectifier 15, inductance 2, relay 12, or other apparatus to become hot and damaged. To prevent this any suitable protective device such as a fuse or heat coil 16 may be connected in any of the circuits. The preferred arrangement shown in Fig. 3 comprises a heat coil 16 which will allow the normal starting current to flow in the starting circuit momentarily to operate relay 12 and start the oscillating current without operating heat coil 16. However, if this circuit is repeatedly closed and opened, heat coil 16 will operate to open the operating circuit and close a circuit to line 17 which may be connected to any suitable alarm or trouble indicating circuit (not shown).

Figure 4:
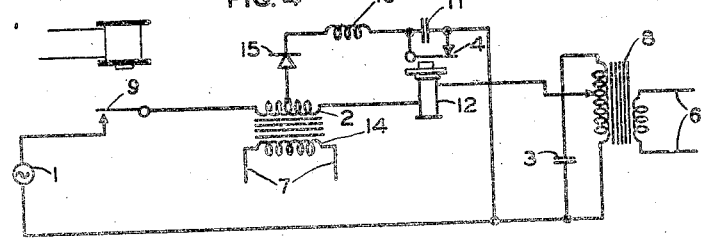
Fig. 4 shows a modified starting arrangement applied to a circuit similar to the one shown in Fig. 3.

Fig. 4 shows another method of automatically controlling the circuit of the rectifier. Here rectifier 15 is connected across supply 1 and part of inductance 2. In this circuit relay 12 operates on the alternating current flowing through its winding. The operation of relay 12 in Fig. 4 should be retarded to give the direct current flowing through inductance 2 sufficient time to build up to a value sufficient to insure the starting the oscillations when contacts 4 are opened. As in the circuit shown in Fig. 3 the condenser 11 and choke 10 shown in Fig. 4 are provided to suppress radio frequency currents which may cause interference.

When a source of direct current, such as a rectifier, is included in the starting circuit, condenser 3 may be coupled to the oscillating circuit as shown in Fig. 3 through a transformer such as transformer 8 of Figs. 3 and 4. This arrangement stabilizes the circuit and permits more power to be obtained from a given set of coils and condensers. This transformer may also serve as an output transformer.

The exact manner in which this circuit operates is not fully understood but there appears to be at least three different factors which contribute to the improved operation of this circuit.

By coupling the condenser to the circuit through a transformer, the condenser may be operated at a higher voltage and at the same time by normally operating the core of the transformer near the knee of the saturation curve the peak voltages applied to the condenser due to surges and transient currents are limited. This arrangement permits a given condenser to be operated more effectively and at the same time have its apparent impedance in the oscillating circuit greatly reduced. For a given size of condenser and inductance this arrangement permits considerably more power to be taken from the circuit before the oscillations cease.

In addition this transformer 8 appears to stabilize the circuit and to make it less affected by sudden changes in the connected load. In general, if the constants of the usual circuit such as shown in Fig. 1 are adjusted so that the circuit will oscillate satisfactorily at no load, it is impossible to take appreciable power from the circuit before the oscillations cease. If on the other hand the constants are adjusted so the circuit will oscillate satisfactorily when appreciable load is taken from the circuit, then the circuit becomes unstable and usually changes the frequency of oscillation when the load is removed. It has been found that the circuit may be stabilized by adding resistance in series with inductance 2 and condenser 3. This resistance appears to limit the current at no load so that the value of the inductance is not reduced to such a low value that it resonates with condenser 3 at a higher frequency. This resistance however reduces the power that the circuit will deliver before the oscillations or the oscillating current stops. Of course the resistance may be varied with load, such as by including a ballast lamp in the oscillating circuit, but even with such an arrangement it is impossible to vary the resistance as rapidly as the load can change. So this arrangement while permitting some increase in power to be taken from the circuit does not stabilize the circuit and make it insensitive to change in load.

In order to understand more fully some of the factors contributing to the stabilizing action of transformer 8, reference may be had to Fig. 2 which shows a simplified circuit arrangement of Fig. 3. Here transformer 8 is replaced by coil 8 which represents the inductance of transformer 8. It is to be noted that in the circuit shown in Fig. 2 there is no step up in the voltage applied to condenser 3 nor is there an apparent increase in the capacity of this condenser. However, by adjusting the constants of the circuit of Fig. 2 so that the circuit is stable at full load and adjusting the turns of coil 8 so that the iron is just about saturated (near or on the knee of the magnetization curve) then as the load is removed and the current through the circuit tends to increase the voltage across the various elements also tends to increase. This increase in voltage across condenser 3 and coil 8 will reduce the impedance of coil 8 which in turn tends to reduce and limit the voltage and current increase in the circuit as the load is reduced. In this manner coil 8 tends to prevent or reduce any increase in the oscillating current as the load is removed and this tends to stabilize the operation of this system. I find that this arrangement gives excellent operation from the standpoint of load stability throughout a relatively wide range of load conditions. It also gives excellent voltage regulation from the standpoint of maintaining a substantially constant output voltage for relatively wide fluctuations of the input voltage. This is true because the iron of the transformer 8 is operated at or near the knee of the magnetization curve and gives very critical control. The inductance of the coil 8 may be of such a value that it also will resonate with the condenser 3 either at the fundamental frequency or at an harmonic or a lower harmonic of the fundamental frequency of the inductance 2 and the condenser 3. This means that the oscillating circuit including the inductance of the coil or transformer 8 and the condenser 3 may be adjusted to oscillate freely at a fundamental frequency and produce harmonics wherein one of the said harmonics of said oscillating circuit is of a frequency equal to the fundamental frequency of the oscillating circuit including the inductance 2 and the condenser 3. By this arrangement the supply leads 6 may give a frequency equal to the fundamental frequency of said first mentioned oscillating circuit, as well as give a frequency equal to the fundamental frequency of the said second mentioned oscillating circuit.

Coil 8 may provide a further stabilizing action in this circuit. The inductance of coil 8 may be of such a value that it also will resonate with condenser 3 at either the fundamental frequency or an harmonic of the fundamental frequency of inductance 2 and condenser 3. In this case the stabilizing action is the result of tending to make the amplitude of the oscillating current more independent of the load current. This action of the circuit employing coil or transformer 8 may be somewhat like the action of the constant current circuits described on pages 76 to 82 of "Alternating Current Phenomena" by Steinmetz, third edition 1900 published by McGraw Publishing Co. or similar to the "Monocyclic Network" described in an article entitled "Constant Current D-C Transmission" by C. H. Willis, B. D. Bedford, and F. R. Elder published in Electrical Engineering Journal on page 102, vol. 54, No. 1 (January 1935).

Again, when the load is connected to a winding on coil or transformer 8, this transformer may be thought of as tending to isolate the two circuits and to make the oscillating circuit independent of changes in the load circuit. In this respect this arrangement appears to operate in a manner somewhat similar to the manner of operation in certain of the circuits used to stabilize the frequency of vacuum tube oscillators which are described by F. B. Llewellyn in an article entitled "Constant Frequency Oscillators" and published in I. R. E. vol. 19 pp. 2063-2094 for December, 1931.

Also we may consider the coil or transformer 8 as a shunting device for stabilizing the oscillations of the oscillating circuit. When considering the coil or transformer 8 as a shunting device, we may consider the coil or the transformer 8 as functioning to by-pass a portion of the oscillating current from the said shunted portion of the said oscillating circuit. In this manner, the coil or transformer 8 by-passes such portion of the oscillating current as to produce stability of the output circuit throughout a relatively wide range of load conditions, and throughout a relatively wide range of the input voltage. Thus, the voltage across the output leads may be maintained substantially constant for relatively wide variations of the input voltage.

Thus coil or transformer 8 appears to have a three fold stabilizing action which comprises (1) matching or adjusting the impedances of various circuits and elements, (2) tending to prevent changes in the amplitude of the oscillating circuit and (3) making the amplitude of the oscillating current more independent of the load connected to the circuit.

Referring again to Fig. 3, an additional small variable inductance 18 is connected in series with condenser 3 and provides a simple and effective means for controlling the amount of high frequency current in the output circuit. This may be used for an audible ringing signal when this arrangement is used to supply ringing current for a telephone system. This additional or auxiliary inductance may be similarly connected in Fig. 4 and operates in the same manner as described with reference to Fig. 1. In this case contact 9 may be automatically controlled by the illustrated relay either directly or indirectly by ringing keys or relays in cord circuits or machine switching circuits of the telephone system.

In the development of my invention, tests were made using the regular 120 volt 60-cycle commercial power supply. While it is understood that the values and sizes of the various elements of the circuit of Fig. 3 depend upon the power, voltage and current which the circuit must supply as well as upon the supply voltage, I have found, that in a particular embodiment of the invention, a circuit having an inductance 2 wound on an iron core having a cross-sectional area of 2.25 square inches, a transformer 8 having an iron core with a cross-sectional area of 4.5 square inches, and condenser 3 having a capacity of 20 mfd. appears to operate satisfactorily. It is interesting to note that in a circuit as per Fig. 1, when using inductance 2 with 2.25 square inches of iron in the core and a capacity of 20 mfd., the maximum power output at 20-cycles seems to be in the order of 25 watts with very poor output voltage regulation. In fact, it is not unusual for the output voltage to vary as much as 40% between no load and full load of 25 watts.

With my invention as depicted in Fig. 3 and inductance 2 and transformer 8 having the cross-sectional areas mentioned above and using 20 mfd. capacity as before, I have had no difficulty in taking more than 1/8 horse-power of 20-cycle power from this circuit. Also the output voltage regulation is much improved having a total voltage variation, at terminals 6, of only 7% between no load and full load of 1/8 H. P. As used in this specification, the terms "fundamental frequency" or "fundamental current" refer to the resonant frequency or a current having the resonant frequency of the oscillating circuit of the frequency reducing system. The terms "harmonic frequency" or "harmonic current" refer to frequencies or to current having frequencies which are multiples of the fundamental frequency. For example, the third harmonic current or voltage has a frequency which is three times the frequency of the fundamental current or voltage.

In the description and in the claims, the oscillating circuit is characterized as being "adapted to oscillate freely at a fundamental frequency and at the harmonics of the said fundamental frequency". Also, the starting arrangement, described and claimed in the application, is characterized as being adapted "to start free oscillations in the oscillating circuit at the fundamental frequency and at the harmonics thereof". It is further characterized in the description and in the claims that the alternating current from the supply source, which energizes the oscillating circuit, keeps up the said harmonic that has a frequency equal to the frequency of the said source of alternating current and causes continued oscillations of the fundamental current at the fundamental frequency in the oscillating circuit. By this characterization, I mean that, when the circuit is started to oscillate, there is present, in the circuit, a "fundamental current" and "harmonic currents". It is not to be inferred, however, that the oscillating circuit is tuned to oscillate freely at the harmonic frequencies. This is not the case. The oscillating circuit is tuned to oscillate freely at the fundamental frequency, which when the fundamental oscillation takes place, there is present in the circuit both a "fundamental current" and "harmonic current". Summarizing, it is to be pointed out that a frequency reducing arrangement embodying the features of my invention, as shown and described herein, actually produces a current having a reduced frequency, and for this reason it is to be clearly understood that the principle or theory of operation of my invention as explained herein, is to be construed as being merely explanatory. The foregoing description of the principle of operation constitutes the best known theoretical explanation of its operation. Therefore, in no sense shall the theory of operation herein described be construed as a limitation upon the claims, as there may be other explanations of its theory or principle of operation.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A frequency reducing arrangement adapted to be energized by a source of alternating current and to be started in operation by a source of direct current comprising, in combination, an oscillating circuit including a non-linear impedance element and adapted to oscillate freely at a fundamental frequency and at the harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the funadmental current at the fundamental frequency in the oscillating circuit, and means for connecting the non-linear impedance element in circuit relation with the said source of direct current to establish a direct current flux and for disconnecting the non-linear impedance element from circuit relation with the said source of direct current to cause the said direct current flux to collapse and induce a voltage in the non-linear impedance to start free oscillations in the oscillating circuit at the said fundamental frequency and at the harmonics thereof.

2. A frequency reducing arrangement adapted to be energized by a source of alternating current comprising, in combination, an oscillating circuit including a non-linear impedance element and adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, an asymmetrical impedance element, means for connecting the non-linear impedance element in circuit relation with the said asymmetrical impedance element to establish a direct current flux and for disconnecting the said non-linear impedance element from circuit relation with the said asymmetrical impedance element to cause the said direct current flux to collapse and induce a voltage in the non-linear impedance to start free oscillations in the oscillating circuit at the said fundamental frequency and at the harmonics thereof, and output means connected in circuit relation with the said oscillating circuit to provide a source of current having a frequency equal to the said fundamental frequency.

3. A frequency reducing arrangement adapted to be energized by a source of alternating current comprising, in combination, an oscillating circuit including a condenser and an inductance coil wound upon a magnetic core and adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, a rectifier, and automatic switch means for momentarily connecting said rectifier in circuit relation with a winding on said magnetic core to start free oscillations of the oscillating circuit at the said fundamental frequency and at the harmonics thereof.

4. A frequency reducing arrangement adapted to be energized by a source of alternating current comprising, in combination, an oscillating circuit including a non-linear impedance and a condenser and adapted to oscillate freely at a fundamental frequency and at the harmonics of fundamental frequency and at the harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for starting free oscillations of the said fundamental frequency and of the said harmonics in said oscillating circuit, and reactance means connected in shunt circuit relation with the said condenser for stabilizing the operation of the oscillating circuit.

5. A frequency reducing arrangement adapted to be energized by a source of alternating current and to be started in operation by a source of direct current comprising, in combination, an oscillating circuit including a non-linear impedance element and a condenser and adapted to oscillate freely at a fundamental frequency and at the harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for connecting the non-linear impedance element in circuit relation with the said source of direct current to establish a direct current flux and for disconnecting the non-linear impedance element from circuit relation with the said source of direct current to cause the direct current flux to collapse and induce a voltage in the nonlinear impedance to start free oscillations in the oscillating circuit at the said fundamental frequency and at the harmonics thereof, and output means connected in circuit relation with the said oscillating circuit to provide a source of current having a frequency equal to the said fundamental frequency, and reactance means connected in shunt circuit relation with the said condenser for stabilizing the operation of the oscillating circuit.

6. A frequency reducing arrangement adapted to be energized by a source of alternating current comprising, in combination, an oscillating circuit including a condenser and an inductance coil wound on an iron core and adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for starting the said oscillations of said fundamental frequency and of said harmonics in said oscillating circuit, a second circuit tuned by said condenser to stabilize the operation of the said oscillating circuit, and output means connected in circuit relation with one of said circuits to provide a source of current having a frequency equal to the said fundamental frequency.

7. A frequency reducing arrangement adapted to be energized by a source of alternating current comprising, in combination, an inductance wound on an iron core, a transformer having output means to supply a reduced frequency current, a condenser connected in circuit relation with said inductance and said transformer to form two tuned circuits both adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuits in circuit relation with the said source of alternating current to keep up the said harmonic that has a frequency equal to the frequency of the said source of alternating current and to cause continued oscillations of the fundamental current at the fundamental frequency in the oscillating circuits, a rectifier, switch means for momentarily connecting said rectifier in circuit relation with a winding on said iron core to start free oscillations in the oscillating circuits at the said fundamental frequency and at the harmonics thereof, and means for preventing radio interference during the operation of said switch means.

8. A device for giving a source of modified current wherein the device is adapted to be energized by a source of alternating current comprising, in combination, a core, an inductance wound upon the core, a transformer, a condenser, connecting means interconnecting the core, the inductance, the transformer and the condenser for forming two oscillating circuits at least one of which is adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuits in circuit relation with the said source of alternating current to keep up the said harmonic that has a frequency equal to the frequency of the said source of alternating current and to cause continued oscillations of the fundamental current at the fundamental frequency in the oscillating circuits, an output means connected to a winding of said transformer, for supplying a reduced frequency current, another inductance connected in series with said condenser to control the high frequency voltage impressed upon said output means, a starting circuit including a protective device, a winding wound on said core, and a rectifier connected to the said winding for starting oscillations in one of said oscillating circuits, a relay comprising a winding and contacts connected in said starting circuit for interrupting said starting circuit, a second winding on said relay connected in series with one of said oscillating circuits for holding said relay operated, and instrumentalities connected to said relay contacts for suppressing radio frequency currents generated by the operation thereof.

9. A frequency reducing arrangement adapted to be energized by a source of alternating current comprising, in combination, an oscillating circuit including a condenser and an inductance wound on a core and adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for starting free oscillations in the oscillating circuit at the said fundamental frequency and at the harmonics thereof, and output means connected across said condenser and a portion of the said inductance to provide a source of current having a frequency equal to the said fundamental frequency.

10. A frequency reducing arrangement adapted to be energized by a source of alternating current comprising, in combination, an oscillating circuit including a condenser and an inductance wound on a core and adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for starting free oscillations in the oscillating circuit at the said fundamental frequency and at the harmonics thereof, an auxiliary inductance connected in series with said condenser, and output means connected to said series combination of said auxiliary inductance and said condenser to provide a source of current having a frequency equal to the said fundamental frequency.

11. A frequency reducing arrangement adapted to be energized by a source of alternating current comprising, in combination, a core, an inductance wound upon the core, a transformer, a condenser, connecting means interconnecting the core, the inductance, the transformer and the condenser for forming two oscillating circuits at least one of which is adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuits in circuit relation with the said source of alternating current to keep up the said harmonic that has a frequency equal to the frequency of the said source of alternating current and to cause continued oscillations of the fundamental current at the fundamental frequency in the oscillating circuits, an output means connected to a winding of said transformer, another inductance connected in series with said condenser to control the high frequency voltage impressed upon said output means, a starting circuit including a protective device, a winding wound on said core, and a rectifier connected thereto for starting oscillations in one of said oscillating circuits.

12. A frequency reducing arrangement adapted to be energized by a source of alternating current comprising, in combination, a plurality of oscillating circuits each adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuits in circuit relation with the said source of alternating current to keep up the said harmonic that has a frequency equal to the frequency of the said source of alternating current and to cause continued oscillations of the fundamental current at the fundamental frequency in the oscillating circuits, means for causing a starting current to flow in the said oscillating circuits to start free oscillations in the said oscillating circuits at the said fundamental frequency and at the harmonics thereof, and output means for providing a source of current having a frequency equal to the said fundamental frequency.

13. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for causing a starting current to flow in the said oscillating circuit to start free oscillations in the said oscillating circuit at the said fundamental frequency and at the harmonics thereof, and stabilizing means shunting a portion of said oscillating circuit to by-pass a portion of the oscillating current from the said shunted portion of the said oscillating circuit, and output means for providing a source of current having a frequency equal to the said fundamental frequency.

14. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, starting means to establish a flux and to cause the flux to collapse for causing a starting current to flow in the said oscillating circuit to start free oscillations in the said oscillating circuit at the said fundamental frequency and at the harmonics thereof, means for delaying the operation of the starting means and establishing a relatively large amount of flux to insure the positive starting of the said oscillations, and stabilizing means shunting a portion of said oscillating circuit to by-pass a portion of the oscillating current from the said shunted portion of the said oscillating circuit, and output means for providing a source of current having a frequency equal to the said fundamental frequency.

15. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, starting means for causing a starting current to flow in the said oscillating circuit to start free oscillations in the said oscillating circuit at the said fundamental frequency and at the harmonics thereof, means for causing the starting means to operate repeatedly at delayed intervals to start the said free oscillations, and stabilizing means shunting a portion of said oscillating circuit to by-pass a portion of the oscillating current from the said shunted portion of the said oscillating circuit, and output means for providing a source of current having a frequency equal to the said fundamental frequency.

16. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for causing a starting current to flow in the said oscillating circuit to start free oscillations in the said oscillating circuit at the said fundamental frequency and at the harmonics thereof, and stabilizing means shunting a portion of said oscillating circuit to by-pass a portion of the oscillating current from the said shunted portion of the said oscillating circuit, output means for providing a source of current having a frequency equal to the said fundamental frequency, and inductance means associated with the oscillating circuit for causing an additional voltage to modify the wave form of the output voltage impressed upon the output means.

17. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for causing a starting current to flow in the said oscillating circuit to start free oscillations in the said oscillating circuit at the said fundamental frequency and at the harmonics thereof, and a transformer having one winding for shunting a portion of said oscillating circuit to by-pass a portion of the oscillating current from the said shunted portion of the said oscillating circuit and having another winding for supplying an output source of current having a frequency equal to the said fundamental frequency.

18. A frequency reducing arrangement adapted to be energized by a source of alternating current comprising, in combination, an oscillating circuit adapted to oscillate freely at a fundamental frequency and produce harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonics that has a frequency equal to the frequency of the said source of alternating current and to cause continued oscillations of the fundamental current at the fundamental frequency in the oscillating circuit, means for causing a current to flow in the said oscillating circuit to start free oscillations in the said oscillating circuit at the said fundamental frequency and at the harmonics thereof, a transformer having one winding for shunting a portion of said oscillating circuit to by-pass a portion of the oscillating current from the said shunted portion of the said oscillating circuit and having another winding for supplying an output source of current having a frequency equal to the said fundamental frequency, and inductance means connected in circuit relation with the transformer to cause an additional voltage to modify the wave form of the output voltage of the transformer.

19. A frequency reducing arrangement adapted to be energized by a source of alternating current comprising, in combination, an oscillating circuit including a non-linear impedance element and a condenser, and adapted to oscillate freely at a fundamental frequency and at the harmonics of the said fundamental frequency, wherein the fundamental frequency is less than the frequency of the said source of alternating current and wherein the frequency of one of said harmonics is equal to the frequency of the said source of alternating current, means for connecting the said oscillating circuit in circuit relation with the said source of alternating current to keep up the said harmonic that has a frequency equal to the frequency of the said source of alternating current and to cause continued oscillations of the fundamental current at the fundamental frequency in the oscillating circuit, means for starting free oscillations in the said oscillating circuit at the said fundamental frequency and at the harmonics thereof, a stabilizing transformer energized by the oscillating circuit and arranged to increase the effective capacitive reactance of the condenser, and output means connected to the transformer for supplying an output current having a frequency equal to the said fundamental frequency.

20. A frequency reducing arrangement adapted to be energized by a source of alternating current comprising, in combination, a first oscillating circuit adapted to oscillate freely at a first fundamental frequency and produce harmonics of the said first fundamental frequency, wherein the said first fundamental frequency is less than the frequency of the said source of alternating current and wherein the frequency of one of said harmonics of the first fundamental frequency is equal to the frequency of the said source of alternating current, means for connecting the said oscillating circuit in circuit relation with the said source of alternating current to keep up the said harmonic of the said first fundamental frequency that has a frequency equal to the frequency of the said source of alternating current and to cause continued oscillations of the first fundamental current at the first fundamental frequency in the oscillating circuit, a second oscillating circuit associated with the first oscillating circuit and adapted to oscillate freely at a second fundamental frequency and produce harmonics of the said second fundamental frequency, wherein the second fundamental frequency is less than the frequency of the said first fundamental frequency and wherein the frequency of one of said harmonics of the second fundamental frequency is equal to the frequency of the said first fundamental frequency, means for starting the oscillations of the said oscillating circuits, and output means for providing a source of current having a frequency equal to the said second fundamental frequency.

21. In combination, an oscillating circuit, means for causing an oscillating current to flow in the oscillating circuit, stabilizing means shunting a portion of said oscillating circuit to by-pass a portion of the oscillating current from the said shunted portion of the said oscillating circuit, and output means energized by the oscillating circuit, said output means providing an output current having a frequency equal to the frequency of the oscillating current in the oscillating circuit.

22. In combination, an oscillating circuit including a non-linear impedance and a capacitor, means for causing an oscillating current to flow in the oscillating circuit, stabilizing means connected in shunt circuit relation with the capacitor, and output means energized by the oscillating circuit, said output means providing a source of current having a frequency equal to the frequency of the oscillating current in the oscillating circuit.

23. In combination, an oscillating circuit including a non-linear impedance and a capacitor, means for causing an oscillating current to flow in the oscillating circuit, and a stabilizing output transformer shunting the capacitor and energized by the oscillating circuit, said transformer providing an output current having a frequency equal to the frequency of the oscillating current.

24. In combination, an oscillating circuit including a non-linear impedance and a capacitor, means for causing an oscillating current to flow in the oscillating circuit, and a stabilizing output transformer having one winding shunting the capacitor and energized by the oscillating circuit and having another winding for supplying an output current having a frequency equal to the frequency of the oscillating current.

25. In combination, an oscillating circuit including a nonlinear impedance and a capacitor, means for causing an oscillating current to flow in the oscillating circuit, and a stabilizing output transformer energized by the oscillating circuit and arranged to increase the effective capacitive reactance of the capacitor.

26. In combination, an oscillating circuit including a non-linear impedance and a capacitor, means for causing an oscillating current to flow in the oscillating circuit, and a stabilizing output transformer shunting the capacitor and energized by the oscillating circuit for providing an output current having a frequency equal to the frequency of the oscillating current, and inductance means connected in circuit relation with the transformer to cause an additional voltage to modify the wave form of the output voltage of the transformer.

27. A frequency reducing arrangement adapted to be energized by a source of alternating current comprising, in combination, a non-linear impedance, a capacitor, a stabilizing impedance, circuit connection for connecting one side of the non-linear impedance to one side of the capacitor, circuit connection for connecting the other side of the non-linear impedance to the source of alternating current, circuit connection for connecting the other side of the capacitor to the source of alternating current, circuit connection for connecting the stabilizing impedance in shunt with the capacitor, means for starting an oscillating current in the non-linear impedance, the capacitor, the stabilizing impedance and the circuit connections associated therewith, and output connectons to provide an output current having a frequency equal to the frequency of the oscillating current.

28. A frequency arrangement adapted to be energized by a source of alternating current comprising, in combination, a non-linear impedance, a capacitor, a stabilizing transformer having a primary winding with an intermediate tap and a secondary winding, circuit connection for connecting one side of the non-linear impedance to the intermediate tap of the primary winding of the transformer, circuit connection for connecting the other side of the non-linear impedance to the alternating current supply source, circuit connection for connecting one side of the primary winding to the alternating current supply source, circuit connection for connecting the capacitor in shunt with the primary winding of the transformer, and means for starting an oscillating current in the non-linear impedance, the capacitor, the primary winding of the transformer and the circuit connections associated therewith to produce an output current in the secondary winding having a frequency equal to the frequency of the oscillating current.

29. A frequency arrangement adapted to be energized by a source of alternating current comprising, in combination, a non-linear impedance, a capacitor, a stabilizing transformer having a primary winding with an intermediate tap and a secondary winding, circuit connection for connecting one side of the non-linear impedance to the intermediate tap of the primary winding of the transformer, circuit connection for connecting the other side of the non-linear impedance to the alternating current supply source, circuit connection for connecting one side of the primary winding to the alternating current supply source, circuit connection for connecting the capacitor in shunt with the primary winding of the transformer, means for starting an oscillating current in the non-linear impedance, the capacitor, the primary winding of the transformer and the circuit connections associated therewith to produce an output current in the secondary winding having a frequency equal to the frequency of the oscillating current, and inductance means connected in series with the capacitor and the primary winding of the transformer to cause an additional voltage to modify the wave form of the output voltage of the transformer.

30. In combination, a transformer having a secondary winding and a primary winding having an intermediate tap, a plurality of oscillating circuits having connections connected respectively to the two sides and the intermediate tap of the primary winding of the transformer, the said secondary winding being adapted to deliver a current having a frequency equal to the frequency of the oscillating current of the oscillating circuits.

31. In an electrical oscillating system adapted to energize a variable electrical load varying in a range between substantially no-load to full-load, in combination, an oscillating circuit having a non-linear impedance, wherein the oscillating circuit becomes detuned by changeable values of the oscillating current, output connection means connected to the oscillating circuit for supplying the variable electrical load throughout the range from substantially no-load to full-load, thereby urging the oscillating current to varying in accordance with changes in the electrical load and tending to cause detuning of the oscillating circuit, and stabilizing means responsive to the variable load condition for giving stability to the tuning.

32. An electrical system adapted to be energized by an alternating current variable voltage supply source and arranged to deliver a substantially constant output voltage comprising, in combination, an oscillating current including a non-linear inductance element and a capacitor adapted to be energized by the said supply source, and arranged to resonate at a frequency lower than the frequency of the supply source, and stabilizing means shunting the capacitor to by-pass a portion of the oscillating current around the capacitor and stabilizing the voltage across the capacitor, and output means connected in circuit relation with the capacitor of the oscillating circuit, said output means being adapted to deliver a substantially constant output voltage for relative wide variations of the voltage of the supply source.

CLOSMAN P. STOCKER.